United States Patent [19]

Kametani

[11] Patent Number: 4,956,800
[45] Date of Patent: Sep. 11, 1990

[54] ARITHMETIC OPERATION PROCESSING APPARATUS OF THE PARALLEL PROCESSING TYPE AND COMPILER WHICH IS USED IN THIS APPARATUS

[75] Inventor: Masatsugu Kametani, Ibaraki, Japan

[73] Assignee: Hitachi, Ltd., Tokyo, Japan

[21] Appl. No.: 208,107

[22] Filed: Jun. 17, 1988

[30] Foreign Application Priority Data

Jun. 19, 1987 [JP] Japan ............................. 62-151207
Jul. 3, 1987 [JP] Japan ............................. 62-165338

[51] Int. Cl.⁵ ............................................. G06F 7/38
[52] U.S. Cl. ....................................... 364/736; 64/200
[58] Field of Search ............... 364/736, 200 MS File, 364/900 MS File, 300 MS File

[56] References Cited

U.S. PATENT DOCUMENTS

| | | | |
|---|---|---|---|
| 4,149,241 | 4/1979 | Patterson | 364/200 |
| 4,367,524 | 1/1983 | Budde et al. | 364/200 |
| 4,376,976 | 3/1983 | Lahti et al. | 364/200 |
| 4,539,655 | 9/1985 | Trussell et al. | 364/900 |

Primary Examiner—Gary V. Harkcom
Assistant Examiner—Long T. Nguyen
Attorney, Agent, or Firm—Antonelli, Terry, Stout & Kraus

[57] ABSTRACT

A first processor outputs a series of macro instruction steps which are obtained by dividing an executing sequence of instructions to specify arithmetic operating processes to proper executing units and to time-sequentially output a macro instruction to indicate the execution of each of the macro instruction steps divided; a second processor takes the series of macro instruction steps from the first processor and output instructions included in the macro instruction step of the relevant step in response to the input of the macro instruction. An arithmetic operation processing apparatus of the parallel processing type consists of an arithmetic operation processing unit to execute the arithmetic operation on the basis of the instruction from the second processor; and an object program is generated for combining an arithmetic operation processing sequence to a plurality of macro sequences consisting of one or more instructions along the relevant processing sequence upon compiling, for defining each macro sequence as a macro instruction step, for assigning them to the second processor, for assigning the data transfer process and the macro instruction outputs for the second processor to the first processor, and during the execution of the n-th macro instruction step by the second processor, for enabling in parallel therewith the data, which will be necessary by the first processor in the (n+1)th and subsequent macro instruction steps, or the resultant data processed by the (n−1)th and preceding macro instruction steps to be transferred between a memory system provided for the first processor and the arithmetic operation processing unit.

13 Claims, 11 Drawing Sheets

| | |
|---|---|
| ┌─LOOP I,0,9<br>│  MA(J+20+I)→AR(I)<br>│  MB(J+20+I)→BR(I)<br>└─LOOPEND | DTi |
| ┌─LOOP I,0,9<br>│  AR(I)→MA(J+I)<br>│  BR(I)→MB(J+I)<br>└─LOOPEND | |
| ┌─LOOP I,0,9<br>│  AR1←AR(I)+BR(I)<br>│  AR2←AR(I)*BR(I)<br>│  AR(I)←AR1/AR2<br>│  BR(I)←AR2/AR1<br>└─LOOPEND | MTi |
| ┌─LOOP I,0,9<br>│  MA(J-10+I)→CR(I)<br>│  MB(J-10+I)→DR(I)<br>└─LOOPEND | DTi+1 |
| ┌─LOOP I,0,9<br>│  CR(I)→MA(J+10+I)<br>│  DR(I)→MB(J+10+I)<br>└─LOOPEND | |
| ┌─LOOP I,0,9<br>│  AR1←CR(I)+DR(I)<br>│  AR2←CR(I)*DR(I)<br>│  CR(I)←AR1/AR2<br>│  DR(I)←AR2/AR1<br>└─LOOPEND | MIi+1 |

MACRO PROCESS i / MACRO PROCESS i+1

53

ARITHMETIC OPERATION PROCESSING APPARATUS OF THE PARALLEL PROCESSING TYPE AND COMPILER WHICH IS USED IN THIS APPARATUS

CROSS-REFERENCE OF RELATED APPLICATION

The present application relates to U.S. patent application Ser. No. 123,279 which corresponds to U.S. Pat. No. 4,870,608 entitled METHOD AND APPARATUS FOR FLOATING POINT OPERATION filed on Nov. 20, 1987 in the name of Masanobu Kametani.

BACKGROUND OF THE INVENTION

The present invention relates to an arithmetic operation processing apparatus for performing arithmetic operations, such as numerical value arithmetic operations and the like, and, more particularly, to an arithmetic operation processing apparatus of the parallel arithmetic operating type which is suitable for the application which can perform the arithmetic operation processes at a high speed by enabling an instruction execution sequence and data input/output sequence to be operated in parallel and to provide a compiler which is used in such an apparatus.

Hitherto, in the case of constructing an arithmetic operation processing apparatus which operates under the control of a host processor by connecting the host processor to an arithmetic operation processing unit, such as a floating point arithmetic operating unit (FPU) or the like, for example, when scalar processes, such as random arithmetic operations or the like, are executed, the executing time of the arithmetic operations is determined by the total value of the overhead, such as transfer of operand data and indication of an arithmetic operating instruction from the host processor to the arithmetic operating unit, execution of the arithmetic operations by the arithmetic operating unit, transfer of the resultant data from the arithmetic operating unit to the host processor, and the like. On the other hand, when vector arithmetic operations are executed, there is an overhead, such as transfer of vector data having sufficiently long vector lengths from the host processor to a vector register in a vector arithmetic operating unit, indication of a vector arithmetic operating instruction from the host processor to the vector arithmetic operating unit, execution of the vector arithmetic operating processes for all of the vector data by the vector arithmetic operating unit, transfer of the resultant data from the vector register to a main memory in the host processor, and the like. In the foregoing two examples, the elements of the overhead are generally serially added and the arithmetic operating time is determined. This is because the arithmetic operating unit and host processor are connected in a one-to-one corresponding relation and while the arithmetic operating instruction is being executed by the arithmetic operating unit, the host processor cannot execute and access to a register file in the arithmetic operating unit and the indication of the next instruction. As such a kind of apparatus, there is a conventional arithmetic operation processing apparatus comprising a host processor and an arithmetic operating unit disclosed in the literature of "NIKKEI ELECTRONICS", No. 399, July 14, 1986, pages 172 and 173.

In the program for an ordinary processing apparatus, even if the transfer process and arithmetic operating process can be executed in parallel, it is difficult to describe the parallel processing capability. In particular, special means is needed to develop the source program which is described by the conventional system to the object program so as to meet the parallel processing capability of the processing apparatus.

A vector processor can be mentioned as an example of a conventional processing apparatus having parallel processing means. Particularly, a commercially available super computer has means for describing by one instruction the vector arithmetic operations which are operated by the pipeline processes as a vector arithmetic operating instruction. As such a kind of conventional apparatus, there is a compiler system of a super computer which is disclosed in "NIKKEI ELECTRONICS", No. 387, Jan. 27, 1986, pages 201 to 206.

In the arithmetic operation processing apparatus which is constructed so as to operate under the control of a host processor by connecting the host processor to an arithmetic operation processing unit by a conventional method, no consideration is given to the random arithmetic operations (scalar processes) or small-scale vector arithmetic operations in which the real-time processes are requested, so that a large amount of overhead occurs. Particularly, in recent years when the processing speed in the substantial arithmetic operation executing section rapidly becomes higher and higher owing to the advancement of the VLSI technique, an amount of additional overhead, such as transmission and reception and the like of necessary data and instructions between the host processor and the arithmetic operating unit, is becoming much larger than the executing section of the arithmetic operations by the arithmetic operating unit in the random arithmetic operations and small-scale vector arithmetic operations mentioned above. This inhibits the realization of a high processing speed and an improvement of the cost performance of the system.

A practical example of such a conventional construction will now be described hereinbelow with reference to the drawings.

FIG. 1 shows a conventional arithmetic operation processing apparatus comprising a host processor and an arithmetic operating unit. A host processor 2 comprises: a main memory 6; a CPU 5; and an interface circuit 7 to provide necessary signals to an arithmetic operating unit. An arithmetic operating unit 1 comprises: a microsequencer 15; a micro code memory 16; a control line producing circuit 17; an executing unit 18 (such as an ALU, multiplier, or the like) to execute arithmetic operations; a register file 22; an instruction decoder 19 to analyze instructions; a bus buffer 26 to connect the host processor to an internal bus $l_1$; and the like. In the arithmetic operating unit 1, addition, subtraction, multiplication, and division regarding data stored in the register file 22, various kinds of defined functions, and the like are realized as minimum arithmetic operation unit (fundamental arithmetic operation) function. According to this system, the host processor uses the interface circuit 7 and bus buffer 26 and indicates the necessary addresses (corresponding to the register number) to the register file 22 and transfers the necessary data. Next, the host processor indicates an instruction to the instruction decoder 19, thereby activating the microsequencer 15 and executing the necessary arithmetic operation. Until the execution of the arithmetic operation is finished, access to the register file 22 and the transmission of the next instruction by the host processor must wait. After completion of the arithmetic operation, the opening of the bus buffer 26 is permitted by a control line $l_2$. FIG. 2 shows a sequence to execute the arithmetic operation in this case. Data inputs and outputs between the host processor 2 and the arithmetic operating unit 1 are indicated at $D_1$ to $D_4$. The transmission of arithmetic operating instructions from the host processor 2 to the arithmetic operating unit 1 is represented at $I_1$ to $I_4$. The execution of the arithmetic operating instructions transmitted in the arithmetic operating unit is shown at $E_1$ to $E_4$. Arrows in the vertical direction represent the flow of the operations. As shown in the diagram, the processes flows in a serial manner and many idle times (indicated by broken lines in the diagram) occur in each unit.

On the other hand, in the compiler system of the super computer, fairly large vector lengths are combined for every arithmetic operation and executed by the hardware and it is impossible to process the arithmetic operations whose parameters have a complicated relation, random arithmetic operations (scalar arithmetic operations), and the like. Therefore, a small-scale problem or the problem which requires a real-time process cannot be effectively processed, so that the application is fairly limited. On the other hand, a general computer system does not have means for describing the parallel processing capability and means for generating the parallel object programs.

SUMMARY OF THE INVENTION

It is an object of the present invention to provide an arithmetic operation processing apparatus of the parallel arithmetic operating type in which the additional overhead associated with the foregoing arithmetic operating processes can be reduced and the overall arithmetic operation executing time can be reduced and the high processing speed can be realized.

Another object of the invention is to provide an arithmetic operation processing apparatus having a compiler system in which even in the vector arithmetic operation processes or random arithmetic operation processes (scalar arithmetic operation processes) whose parameters have a relatively complicated relation, the data transfer process with a memory system and the arithmetic operation executing process can be executed in parallel and it is possible to effectively use the parallel processing capability of the hardware, thereby realizing a high arithmetic operation processing speed.

According to an arithmetic operation processing apparatus of the parallel arithmetic operating type in the present invention, in addition to a host processor as a first processor, a macro instruction sequence processor as a second processor which commonly uses an arithmetic operating unit is provided, the macro instruction sequence processor having a function which is equivalent to at least the instruction indicating operation (the execution sequence part of the program for the arithmetic operating unit which is conventionally supported in the host processor) of the arithmetic operation executing sequence, the direct instruction indicating operation to the arithmetic operating unit being performed by the second processor in place of the first processor, and thereby executing in parallel the accessing operation of the arithmetic operating unit to the register file which is performed by the host processor for the purpose of the transmission and reception of the necessary data, the arithmetic operation execution indicating operation by the macro instruction sequence processor, and the substantial arithmetic operation executing process of the arithmetic operating unit which is realized by such an arithmetic operation execution directing operation and thereby reducing the additional overhead.

The instruction indicating operation between the host processor and the macro instruction sequence processor is executed by a method whereby the arithmetic operation executing sequence instruction indicating programs of the macro instruction sequence processor to the arithmetic operating unit are combined to one instruction unit or a unit of a plurality of instruction steps along the executing sequence to thereby form macro instructions, and a series of these macro instructions are sequentially indicated from the host processor to the macro instruction sequence processor by the simpler instruction indicating operation. Practically speaking, there is provided means for giving the number of instructions to be executed by the arithmetic operating unit to the macro instruction sequence processor from the host processor as a macro instruction, for counting the number of instructions executed by the arithmetic operating unit after the macro instruction had been given from a counter, for stopping the operation of the macro instruction sequence processor when the count value coincides with the number of instructions which is designated by the macro instruction, and for setting the apparatus into the standby mode to wait for the indication of the next macro instruction.

On the other hand, there is also provided means for regarding that the macro instruction is being executed when they do not coincide and for setting the apparatus to the standby mode to wait for the indication of the next macro instruction until the completion of the execution of this macro instruction. There is also provided means for enabling a register file in the arithmetic operating unit to be uncontradictorily accessed from the host processor even during the execution of the arithmetic operation. In parallel with that the macro instruction sequence processor instructs the arithmetic operating instructions of the number indicated to the arithmetic operating unit by the macro instruction, the host processor transfers the data which will be necessary for the next macro instruction to the register file in the arithmetic operating unit or reads out the results of the past arithmetic operations from the register file in the arithmetic operating unit.

As explained above, even for the random arithmetic operations or small-scale vector arithmetic operations, only the transfer process of the operand data or the like and the very simple indicating operation of the macro instruction are left as the arithmetic operation processing overhead of the host processor. These are performed so as to overlap the complicated arithmetic operation indicating operations to the arithmetic operating unit by the macro instruction sequence processor. Therefore, as compared with the conventional apparatus, the fairly substantial additional overhead can be reduced and at the same time, the real-time processing capability is not largely lost. In particular, with respect to the vector processes, a relatively large number of arithmetic operation instructions can be combined to thereby form macro instructions and the substantial overhead mainly relates to the transfer process of the vector data. On the other hand, in the vector processes, since the vector data is successively arranged into the main memory or register file in the arithmetic operating unit, the data can be moved at a high speed by a transfer instruction, DMA, or the like and the overhead can be further reduced.

In the compiler in the present invention, there are provided: a second processor which has object programs to execute the arithmetic operating processes and has hardware means for dividing the whole processing sequence for the arithmetic operating processes given by those object programs into several macro sequences and for defining a set of instructions included in each of the macro sequences as one macro instruction step and capable of executing one macro instruction by one by the macro instruction from the outside and directs each instruction to an arithmetic operation executing unit in accordance with the flow of the object programs; and a first processor which has means for directing the macro instruction to the second processor and transfer processing means for transferring necessary data to the arithmetic operation executing unit and controls the flow of the whole arithmetic operating processes, wherein both of the first and second processors and the arithmetic operation executing unit are enabled so as to operate in parallel, and there is added compiler means for converting the source program into the two object programs which are divided into a program part for directing the instruction and a program part for transferring the necessary data and distributed to those two corresponding processors in a manner such that while the second processor is executing the nth macro instruction, the first processor can perform the transfer process of the data which will be necessary for the (n+1)th and subsequent macro instructions to the arithmetic operation executing unit or the transfer process of the resultant data processed by the macro instructions before the (n−1)th macro instruction.

Therefore, until the macro instruction step which is at present being executed is finished, the information which will be newly necessary in the next and subsequent macro instruction steps can be previously sent to the arithmetic operating unit and the arithmetic operation executing unit can be continuously made operative. On the other hand, so long as a command for the next macro instruction is not sent from the first processor, the second processor does not advance to the process in the next macro instruction step. Thus, by constituting such that the next macro instruction is not transmitted until the first processor finishes the transmission of all of the data to the arithmetic operation executing unit, no contradiction occurs in the arithmetic operating processes. If the resultant data of the processes in the nth macro instruction step is necessary for the processes in the (n+1)th and subsequent macro instruction steps, it is sufficient that the arithmetic operation executing unit itself shifts the resultant data into the necessary memory area in the arithmetic operation executing unit. Further, the resultant data can be also returned to the main memory by the first processor during the operation of the arithmetic operation executing unit. Almost of the transfer processes can be realized in parallel with the executing processes of the arithmetic operations. Thus, the arithmetic operation executing unit can be always held in the executing state and the arithmetic operating processes can be most effectively executed.

BRIEF DESCRIPTION OF THE DRAWINGS

Figure 13:
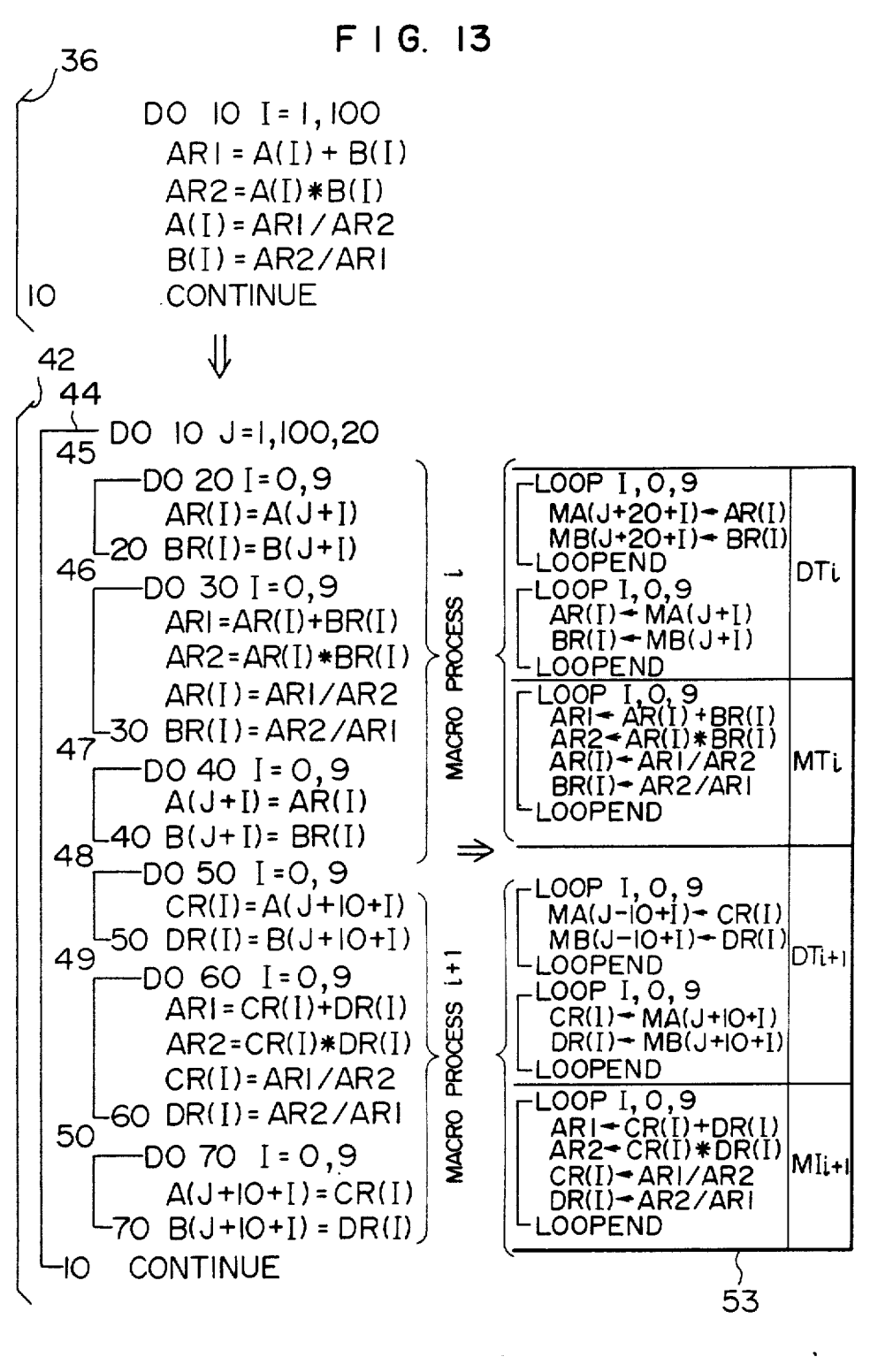

FIG. 13 is a second example diagram showing the development of vector processes by the compiler system.

DESCRIPTION OF THE PREFERRED EMBODIMENTS

Figure 3:
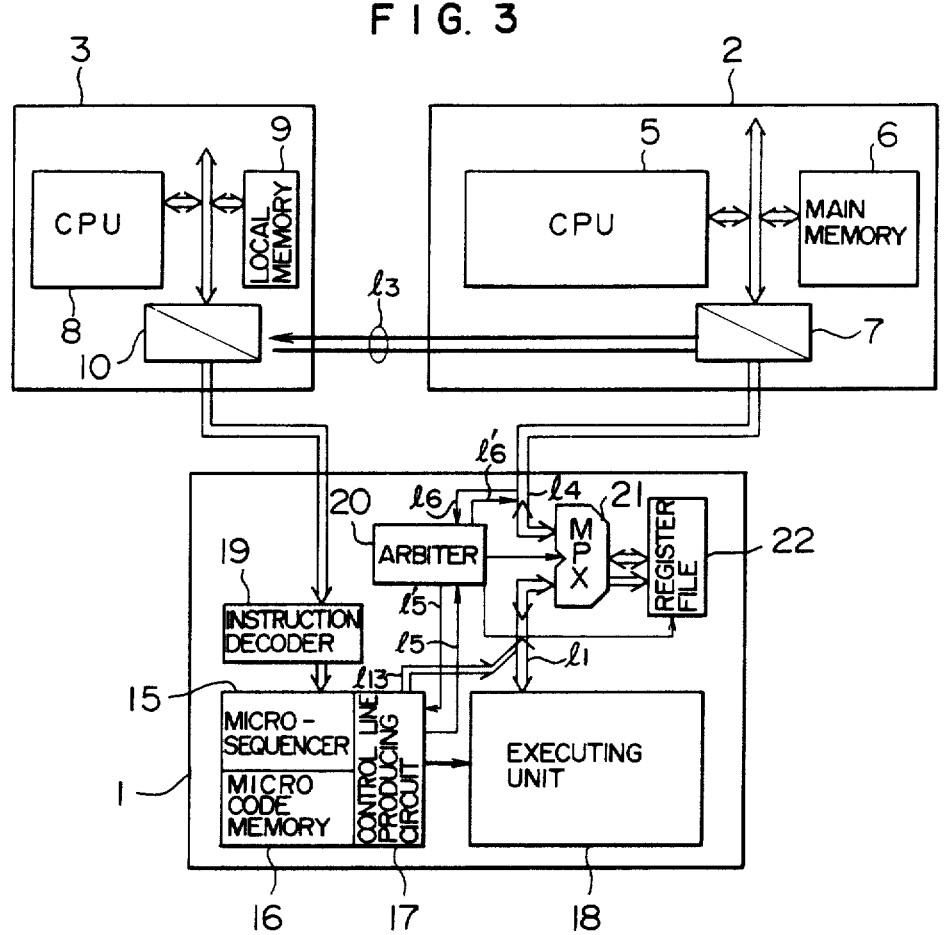
FIG. 3 is a block diagram showing the first embodiment of the present invention.

FIG. 3 shows a block diagram of an arithmetic operation processing apparatus according to the present invention. The arithmetic operation processing apparatus comprises: the arithmetic operating unit 1; the host processor 2 (the first processor) in which arithmetic operation instruction sequence programs are held and a desired arithmetic operating function of the user is realized by these programs; and a macro instruction sequence processor 3 (a second processor) to indicate the arithmetic operation executing sequence instructions to the arithmetic operating unit.

Among them, the host processor 2 comprises: a main memory 6; a CPU 5; and an interface circuit 7 to provide necessary signals to the arithmetic operating unit. There is no need to particularly arrange the interface circuit 7 on the host processor side. The interface circuit 7 can be also arranged between the host processor 2 and the arithmetic operating unit 1 or on the side of the arithmetic operating unit 1. The arithmetic operating unit 1 comprises: the micro sequencer 15, the micro code memory 16; the control line producing circuit 17; the executing unit 18 (ALU, multiplier, or the like) to execute arithmetic operations; the register file 22; the instruction decoder 19 to analyze instructions; a multiplexer 21 for selectively connecting the internal bus $l_1$ and a bus line $l_4$ which extends from the interface circuit 7 in the host processor 2 with the register file 22; and an arbiter 20 to control the multiplexer 21.

In addition to the host processor 2, there is provided the macro instruction sequence processor 3 which can indicate an arithmetic operation executing sequence instruction to the arithmetic operating unit 1. The processor 3 has a CPU 8, a local memory 9, and an interface circuit 10 to supply necessary signals to the arithmetic operating unit. The processor 3 has a connecting path to the instruction decoder 19 in the arithmetic operating unit 1 and can indicate an instruction as an arithmetic operating instruction to the arithmetic operating unit in place of the host processor.

Further, the interface circuits 7 and 10 have the functions to indicate the macro instructions from the host processor 2 to the macro instruction sequence processor 3 and to produce a data line $l_3$ for obtaining a synchronization of the processing sequence. According to this system, at least the data input/output operations from the host processor 2 and the instruction indicating operation from the sequence processor 3 can be operated in parallel. The arithmetic operating unit 1 is newly provided with the multiplexer 21 to selectively connect either the internal bus $l_1$ consisting of a data bus on the side of the executing unit 18 and an address bus $l_{13}$ from the control line producing circuit 17 or the bus line $l_4$ on the side of the host processor 2 to the register file 22. The switching control of the multiplexer 21 is performed by arbitrating either one of an access request $l_5$ on the micro sequencer side and an access request $l_6$ from the host processor side in accordance with a proper priority and activating an access permission line ($l'_5$ on the micro sequencer side or $l'_6$ on the host processor side) corresponding to the arbitrated access request. Consequently, even during the operation of the executing unit 18, almost all of the time when the executing unit does not use the register file 22, it can be accessed by the host processor 2. Therefore, the data input/output operations of the host processor 2 and the arithmetic operation executing process of the arithmetic operating unit 1 can be performed in parallel.

As will be explained in detail with reference to FIG. 4, an instruction I as an arithmetic operation processing instruction of each step in the arithmetic operating unit 1 is written into the main memory 6 or local memory 9 by the machine language as a series of macro instruction steps $I_n$ which are obtained by dividing the executing sequence on a proper execution unit basis. A macro instruction $MI_n$ to indicate the execution of each macro instruction step $I_n$ in the macro instruction sequence processor 3 is also previously written into the main memory 6 by the machine language and output from the host processor 2 to the sequence processor 3 by a proper system clock. If the macro instruction steps $I_n$ have been written in the main memory 6, they are transferred to the local memory 9 in the sequence processor 3 at a proper timing.

Figure 1:
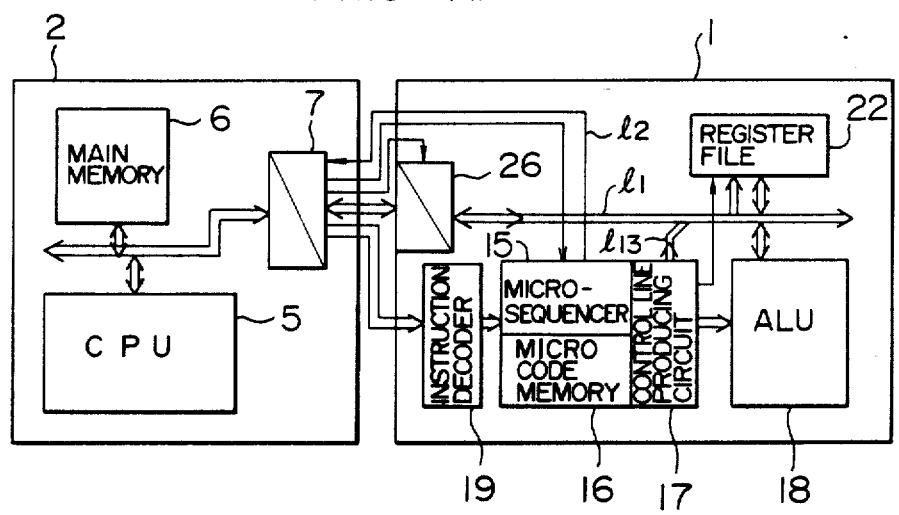
FIG. 1 is a block diagram showing an arrangement of a conventional arithmetic operation processing apparatus.
Figure 2:
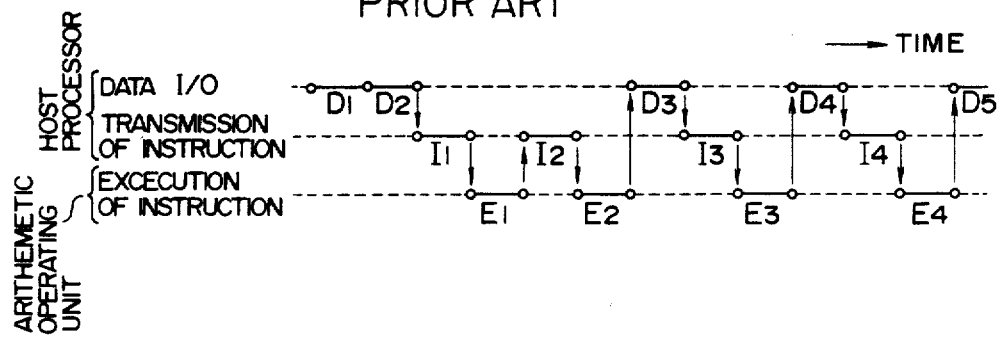
FIG. 2 is a chart showing an arithmetic operation processing sequence in the constitution shown in FIG. 1.
Figure 4:
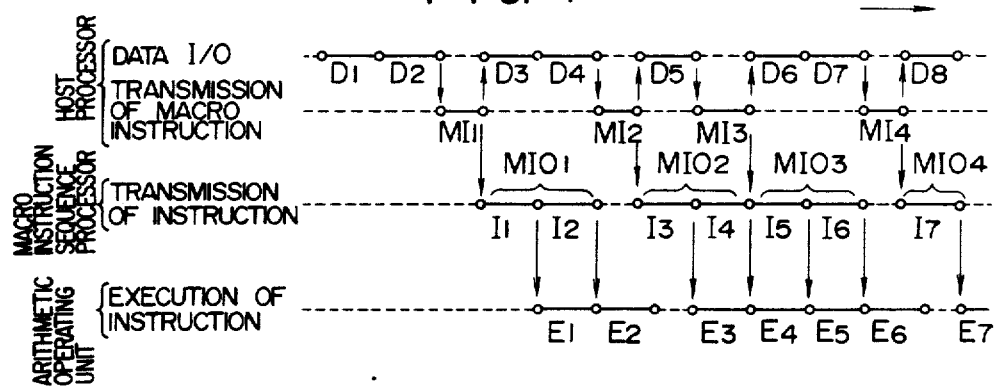
FIG. 4 is a chart showing an arithmetic operation processing sequence according to a constitution of FIG. 3.

FIG. 4 shows a state of the arithmetic operating processes in the embodiment described above and corresponds to FIG. 2 showing the conventional example. First, after the host processor 2 has loaded data $D_1$ and $D_2$ into the register file 22 in the arithmetic operating unit 1, the host processor 2 indicates a first macro instruction $MI_1$ to the sequence processor 3. Since the macro instruction is indicated by using a simple code, the executing time can be reduced. The macro instruction $MI_1$ represents a set $MIO_1$ of two actual instructions $I_1$ and $I_2$ in the arithmetic operating unit 1. The sequence processor 3 sends the instructions $I_1$ and $I_2$ to the arithmetic operating unit 1 in accordance with this order and is returned to the standby mode to wait for the next macro instruction. On the other hand, the arithmetic operating unit 1 performs executions $E_1$ and $E_2$ corresponding to the instructions $I_1$ and $I_2$. During this execution, the host processor 2 loads data $D_3$ and $D_4$ which will be necessary next, into the register file 22 in parallel. In a manner similar to the above, the respective processes are executed. It will be understood that as compared with the conventional example shown in FIG. 2, the idle time in each unit is reduced and the efficiency which is almost twice as high as that in the conventional example is derived.

Figure 5:
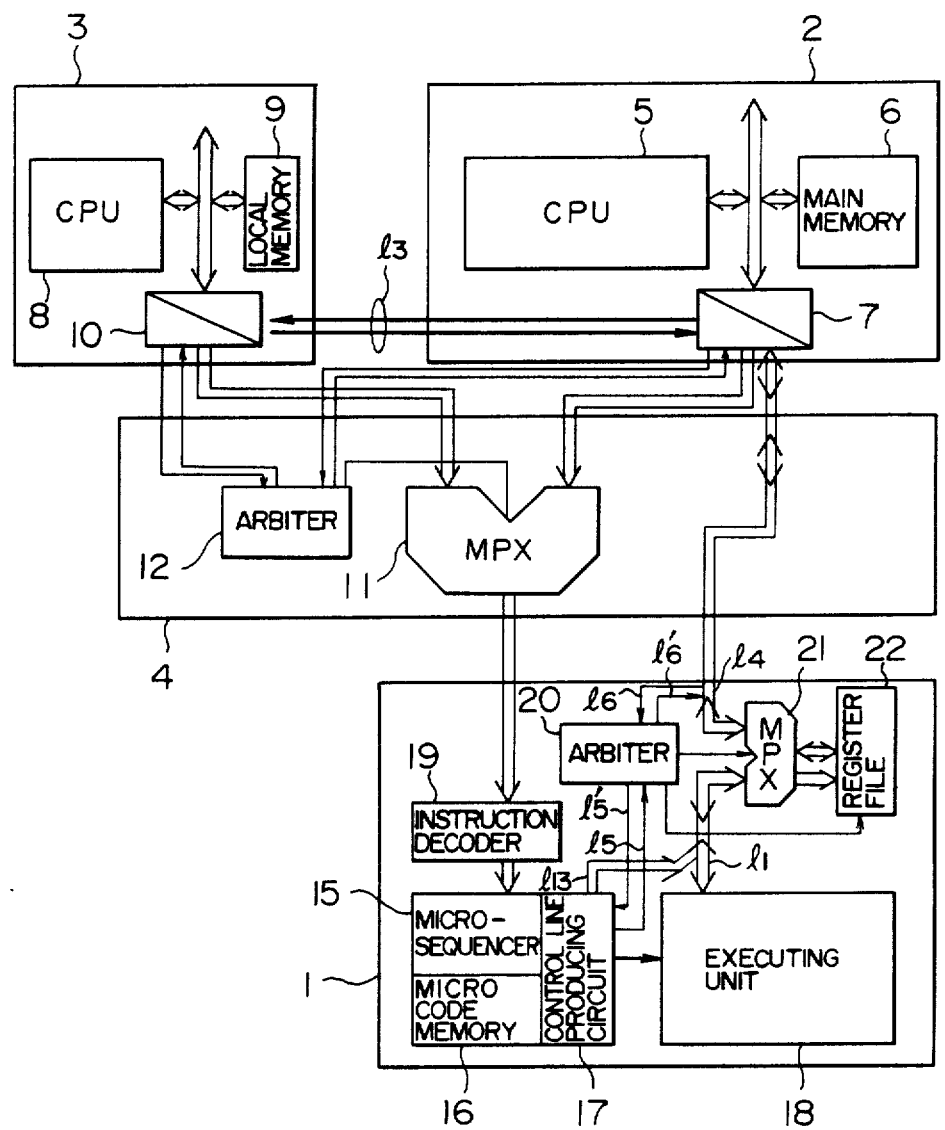
FIG. 5 is a block diagram showing the second embodiment of the invention.
Figure 6:
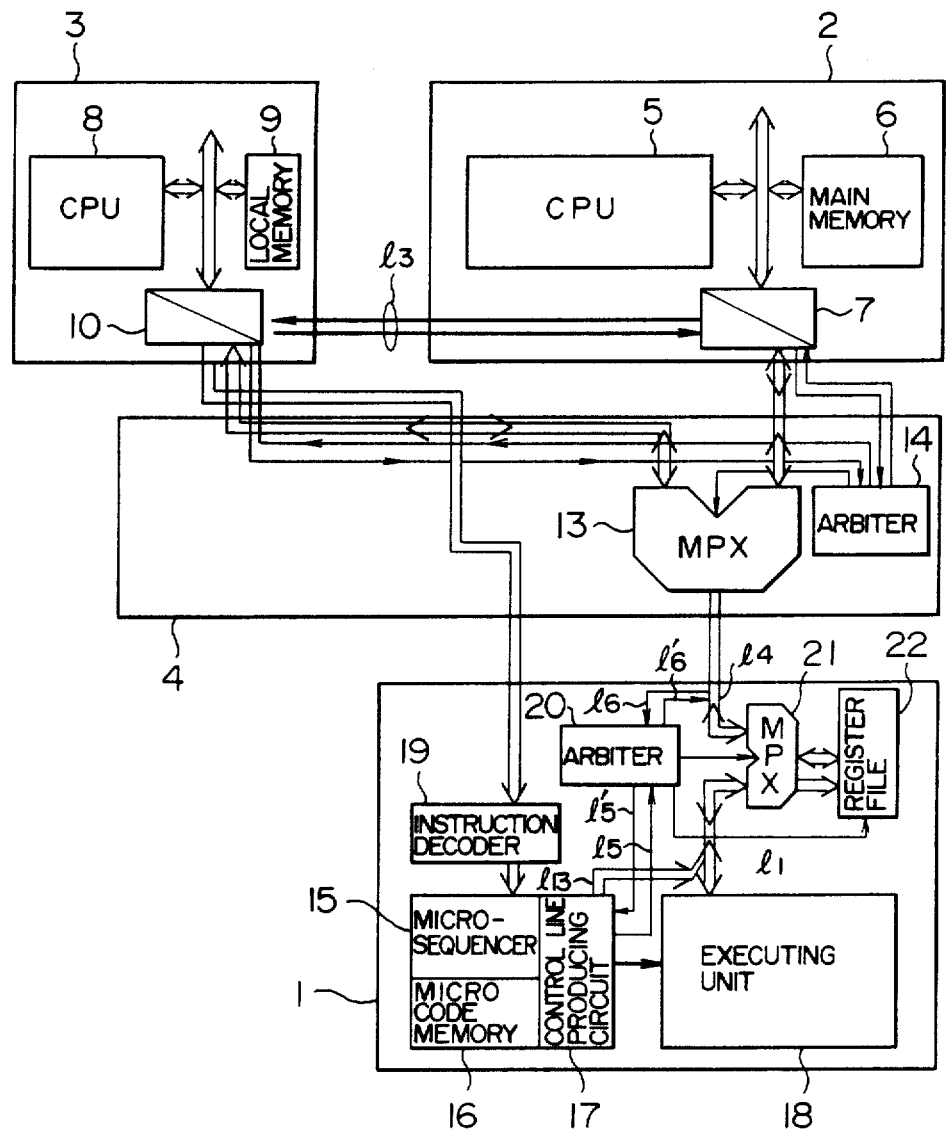
FIG. 6 is a block diagram showing the third embodiment of the invention.
Figure 7:
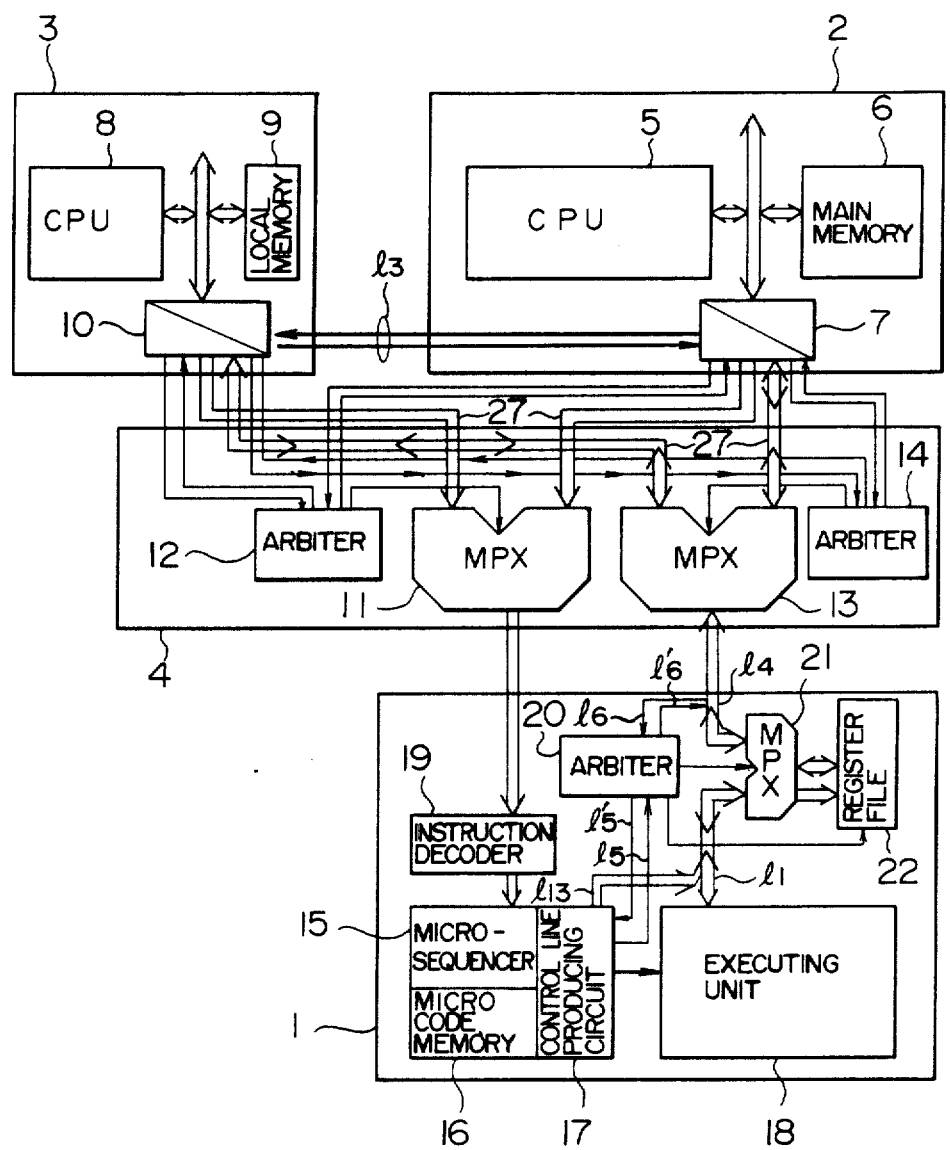
FIG. 7 is a block diagram showing the fourth embodiment of the invention.

FIGS. 5, 6, and 7 show modifications of the embodiment shown in FIG. 3. In any of these modifications, the host processor 2 and macro instruction sequence processor 3 commonly use the arithmetic operating unit 1 by way of a multiplexer unit 4.

In the example of the construction of FIG. 5, the multiplexer unit 4 has therein a multiplexer 11 to multiplex the instruction transmission decoder line and an arbiter 12 to arbitrate the multiplexer 11. With this construction, the host processor 2 can transfer data between the main memory 6 and the register file 22 for the arithmetic operating unit 1 and can directly transmit instructions to the instruction decoder 19 through the multiplexer 11. The macro instruction sequence processor 3 performs only the transmission of instructions in such a manner as to commonly use the instruction decoder 19 together with the host processor 2.

On the other hand, in the construction of the embodiment shown in FIG. 3, the roles of the host processor and macro instruction sequence processor are perfectly separated, the host processor 2 plays the role for the data input and output, and the sequence processor 3 plays the role for the transmission of instructions to the arithmetic operating unit 1.

In the modification shown in FIG. 6, the multiplexer unit 4 has a multiplexer 13 to multiplex the data input/output lines and an arbiter 14 to arbitrate the multiplexer 13. With the multiplexer 13, the host processor 2 and sequence processor 3 can perform the data transfer for the register file 22 and, further, instructions are sent to the instruction decoder 19 by only the sequence processor 3.

In the modification shown in FIG. 7, the multiplexer unit 4 has both multiplexers 11 and 13 to respectively multiplex an instruction transmission decoding line 27 and a data transfer line 27'. According to the block construction of FIG. 7, both of the host processor 2 and the macro instruction sequence processor 3 can transmit instructions to the instruction decoder 19 and perform the data transfer to the register file 22, respectively.

Figure 8:
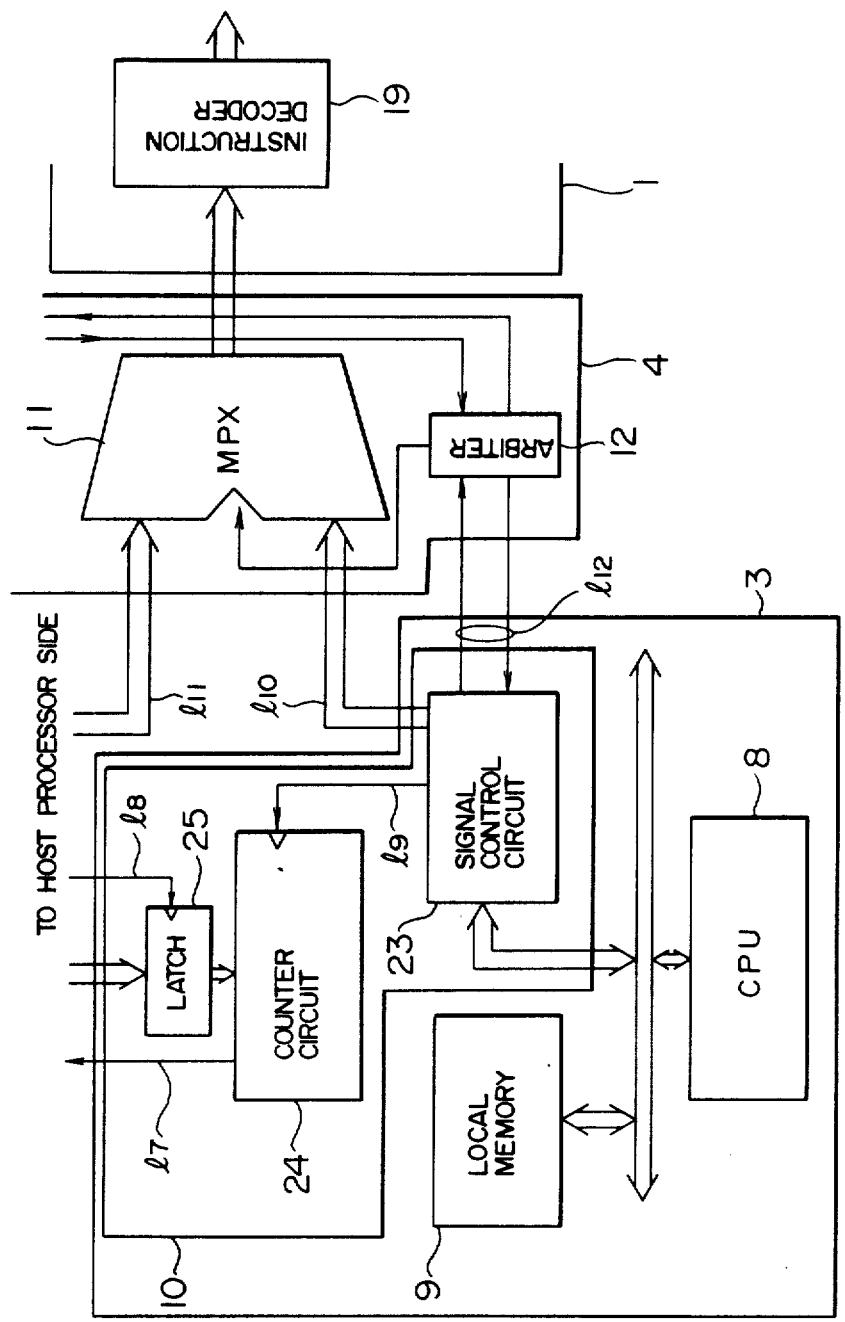
FIG. 8 is a block diagram showing an example of a practical arrangement of a second processor.

FIG. 8 shows a block diagram of a macro instruction indicating circuit from the host processor 2 in the interface circuit 10 to the macro instruction sequence processor 3 in the block construction of the embodiment shown in FIG. 3 and of a circuit which is necessary to obtain the synchronization of the sequence between two processors. The interface circuit 10 comprises: a signal control circuit 23 for producing a signal line $l_{10}$ to send instruction data to the multiplexer 11 and for producing from a signal of the CPU 8 an access request and permission line $l_{12}$ to the instruction decoder 19 in the arithmetic operating unit 1 to the arbiter 12 and a signal line $l_9$ to send a pulse which is generated every transmission of the instruction to a clock input terminal of a counter circuit 24; the counter circuit 24 operates to count the number of arithmetic operating instructions executed; and a latch circuit 25 to latch the number of executed instructions which is output from the host processor 2.

Figure 9:
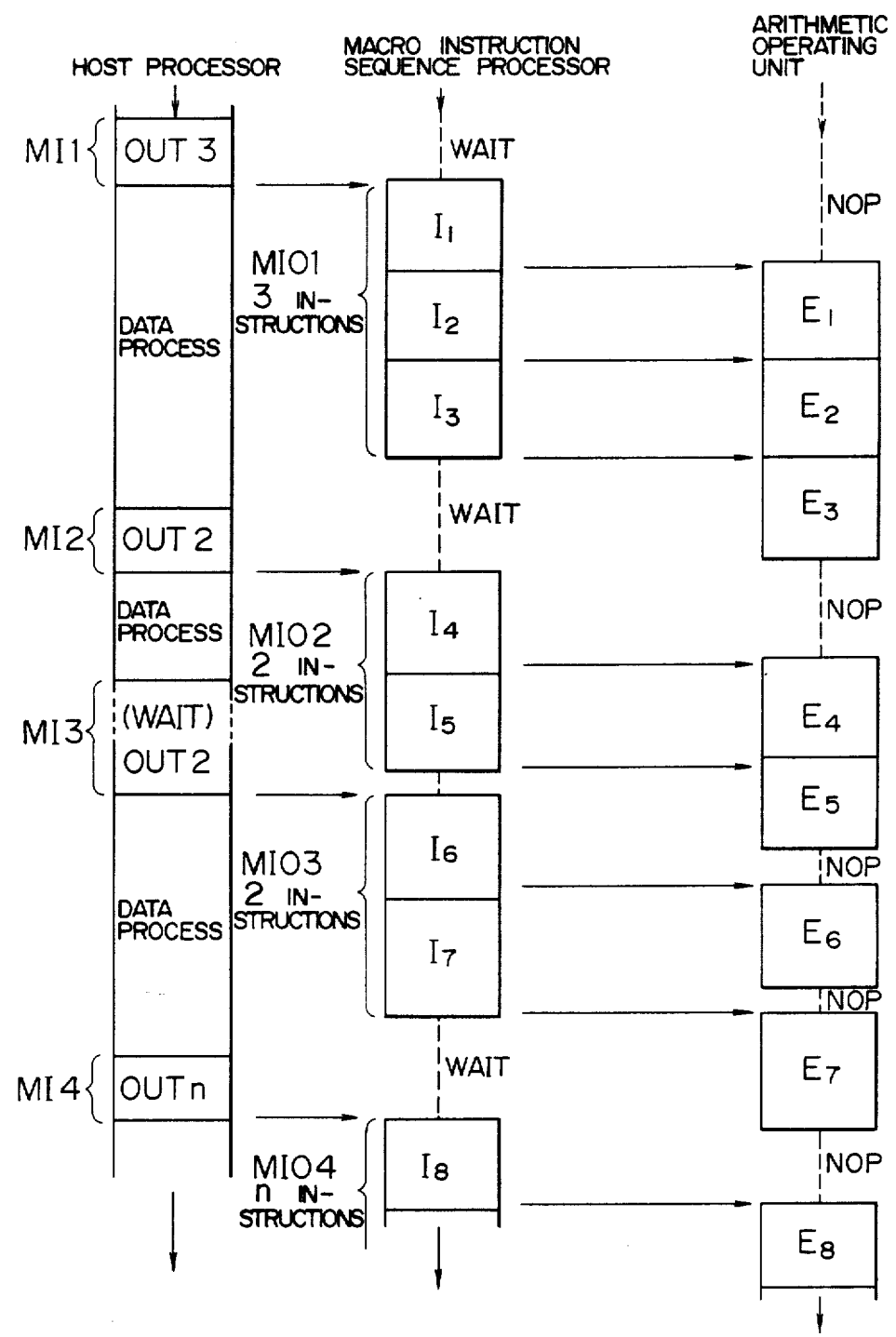
FIG. 9 is a diagram showing macro instruction step constructing means and an executing system.
Figure 10:
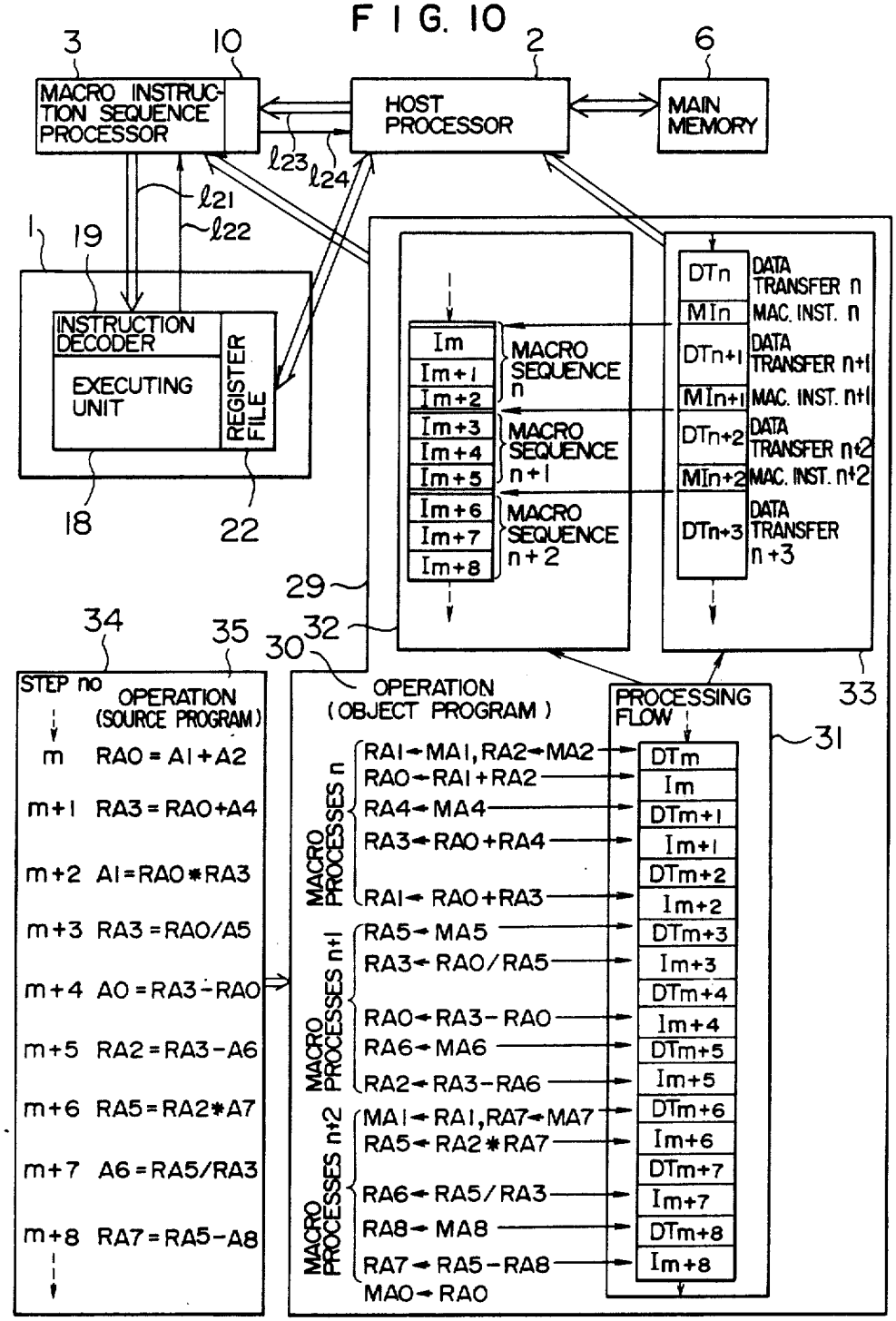
FIG. 10 is a diagram showing a constitution of a parallel processing type compiler according to the invention.

FIG. 9 shows constituting means and executing system of macro instructions which are sent from the host processor 2 to the macro instruction sequence processor 3. The host processor 2 indicates the number of instructions to be next executed by the sequence processor 3 and arithmetic operating unit 1 by a simple instruction such as an OUT instruction or the like whose executing time is short. The indicated number of instructions is stored into the latch circuit 25 in FIG. 8 and this data is directly used as an indication of the macro instruction. If the execution of the preceding macro instruction has already been finished, the latched data is loaded into the counter circuit 24. Each time the instruction is sent, the count value is decreased by one by a pulse signal through a signal line $l_9$. When the count value becomes 0, the zero-count signal is sent to a signal line $l_7$. When the signal line $l_7$ is activated by the zero-count signal, the host processor 2 knows that the next macro instruction can be indicated and sends the number of instructions to be executed next to the latch circuit 25 as a macro instruction. As shown in FIG. 9, the macro instruction 1 ($MI_1$) is a command to execute three instructions and is described like $OUT_3$ (the macro instruction in the case of executing n instructions is described by $OUT_n$). When this macro instruction is sent to the sequence processor 3, if the execution of the preceding macro instruction is not completed yet, the host processor 2 is set to the waiting mode until the completion of the macro instruction which is at present being executed as shown at $MI_3$ in the diagram. In a manner similar to the above, if the macro instruction is sent from the host processor 2 too late, the sequence processor 3 is set to the waiting mode until the next macro instruction is indicated (in this case, "WAIT" is written in the diagram). The arithmetic operating unit 1 successively executes ($E_1, E_2, \ldots$) the indicated instructions ($I_1, I_2, \ldots$).

According to this system, the programs on the side of the sequence processor 3 can be described by the arithmetic operation executing sequence in a conventional manner and can be freely divided to thereby form macro instructions. Therefore, the object programs which are executed by the sequence processor 3 can be also directly executed by the host processor 2. On the other hand, the macro instruction can be indicated by a simple command such as an OUT instruction or the like and can be realized by one machine instruction if an address output line is used. In addition to the effect which is obtained by combining the arithmetic operations, the overhead in association with the indication of instructions can be minimized.

The data input/output operations between the host processor and the arithmetic operating unit which are necessary for instructing processes, the arithmetic operation instruction indicating operation which is executed in the macro instruction sequence processor, and the arithmetic operation executing process which is executed in the arithmetic operating unit can be operated in parallel. Thus, the additional overhead associated with the arithmetic operating processes can be reduced, the overall arithmetic operation processing time can be reduced, and the high processing speed can be realized.

An embodiment of an arithmetic operation processing apparatus having an assembler system of the invention will now be described hereinbelow with reference to FIGS. 10 to 13.

A hardware of the arithmetic operation processing apparatus of the invention comprises: the arithmetic operation processing unit 1 to perform the fundamental arithmetic operating processes in accordance with the indication of the arithmetic operating instruction from the outside; the macro instruction sequence processor 3 for controlling the processing sequence of the fundamental arithmetic operating processes and for indicating the instructions as the fundamental arithmetic operation processing instructions to the arithmetic operation processing unit 1 in accordance with the processing sequence; and the processor 4 to perform the process to transfer the necessary data between the arithmetic operation processing unit 1 and the main memory 6 and the indicating process of the macro instruction to the sequence processor 3.

In the indicating process of the instruction from the sequence processor 3 to the arithmetic operation processing unit 1, the instruction is sent to the instruction decoder 19 in the arithmetic operation processing unit 1 by a data line $l_{21}$, a busy signal indicating that the arithmetic operation is being performed is activated, and this active busy signal is returned to the sequence processor 3 by a line $l_{22}$. Until the busy signal is made non-active, the operation to send the next instruction to the arithmetic operation processing unit 1 by the sequence processor 3 is forcibly set to the waiting mode. The host processor 2 has the macro instruction sending function to indicate to the sequence processor 3 the execution of the macro instruction step which is obtained by dividing the executing sequence of one or more instructions.

Figure 11:
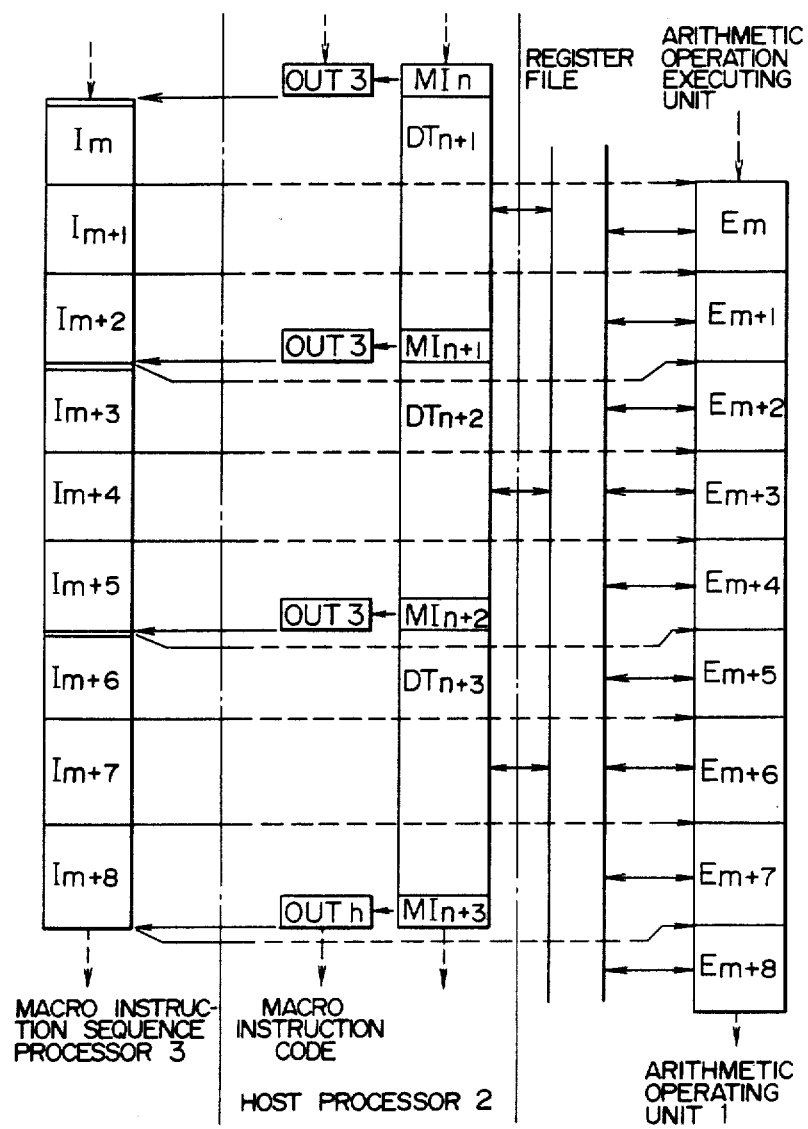
FIG. 11 is a diagram showing parallel processes according to the constitution of FIG. 10.

FIG. 11 shows a generating system of macro instructions. Instructions which are sent from the sequence processor 3 to the arithmetic operation processing unit 1 are represented by $I_k$. Macro instructions which are transmitted from the host processor 2 to the sequence processor 3 are indicated by $MI_k$. The macro instruction $MI_k$ is expressed by a simple transfer instruction such as an OUT instruction for I/O access whose executing time is short. $OUT_k$ denotes that an instruction is made to the sequence processor 3 so as to execute the instructions of k steps. Due to this, arbitrary k continuous instructions can be freely combined and the macro instruction $MI_k$ can be realized. When $OUT_k$ is executed, the number k of steps executed is latched into a counter in an interface circuit 10 for transmission and reception of macro instructions serving as an interface through a signal line $l_{23}$. Then, the operation of the sequence processor 3 is started. The count value of the counter is decreased one by one every transmission of the instruction $I_k$ to the arithmetic operation processing unit 1. When the count value becomes 0, the transmitting operation of the instruction by the sequence processor 3 is forcibly set to the waiting mode until the next macro instruction is sent from the host processor 2. On the other hand, when a busy line $l_{24}$ is made active while the processor 3 is executing the macro instructing process, and when the host processor 2 tries to send the next macro instruction, if the busy line $l_{24}$ is active, the transmitting operation of the macro instruction by the host processor 2 is forcibly set to the waiting mode. As shown in FIG. 11, the transmitting process of the instructions $I_k$ to the arithmetic operation processing unit 1 by the sequence processor 3, the transmitting process of the macro instructions $MI_k$ to the sequence processor 3 by the host processor 2, and the arithmetic operation executing process $E_k$ by the arithmetic operation processing unit 1 are executed in parallel. While the macro instructions and instructions are being processed by the sequence processor 3 and arithmetic operation processing unit 1, the host processor 2 executes in parallel the data transfer processes such that the data, which will be necessary in the processes of the next and subsequent macro instructions, are read out of the main memory 6 and loaded into the register file 22 in the arithmetic operation processing unit 1 or the resultant data which has previously been processed is read out of the register file 22 and stored into the main memory 6. $DT_k$ in FIG. 11 denotes a data transfer process The data transferred to the register file 22 is used in the arithmetic operation instruction executing unit 18 and the result is also returned to the register file 22 at a proper timing. The host processor 2 performs the data communication with the register file 22 so as not to cause a contradiction in the data transfer sequence The content to be processed by the compiler system will now be described with reference to FIG. 10.

The user describes the processing content by using an editing system 34 and makes source programs 35. In this embodiment, a numerical value arithmetic operation processing apparatus is constructed. The arithmetic operation processing content described as the source programs 35 is interpreted by the compiler system and converted into the machine language for numerical value arithmetic operation. The source programs 35 relate to an example of a series of scalar arithmetic operating processes. In the step $n_o$, the steps m to m+8 are extracted. $RA_k$ represents the register file 22 in the arithmetic operation processing unit 1 and the register number is set to k. Ak denotes the data in the main memory 6 and the data number is set to k. When describing such that $RA_0=A_1+A_2$, this means the processes to add data $A_1$ and $A_2$ in the main memory 6 and to transfer the added data to the register $RA_0$ in the arithmetic operation processing unit 1. On the other hand, when describing $RA_3=RA_0+A_4$, this means the processes to add the content of the register $RA_0$ and the memory data $A_4$ and to transfer the added data to the register $RA_3$. Fundamentally, the arithmetic operation processing unit 1 can perform only the arithmetic operations of the data stored in the register file 22. Therefore, to execute the processes of $RA_3=A_1+A_2$, the compiler generates the machine language in a manner such that the data $A_1$ and $A_2$ in the main memory 6 are first transferred to the registers $RA_1$ and $RA_2$ having the corresponding register numbers 1 and 2 in the register file 22 and, thereafter, the addition of $RA_1+RA_2$ is executed and the result is transferred to the register $RA_0$. Reference numeral 30 denotes operations in the case where the source programs 35 are developed into the machine language as an object (denotes a transfer direction of data). In a processing flow 31 corresponding to each process, $DT_k$ indicates the data transfer processes and $I_k$ represent the fundamental arithmetic operation instructing processes. Next, the compiler separates the arithmetic operating processes and the data transfer processes between the main memory 6 and the register file 22 from the flow 31 of the processes which are conventionally serially executed. The compiler combines some of the processes and makes a macro instruction $MI_j$ and a set $DT_j$ of the corresponding transfer processes including the data transfer which will be necessary in the process of the macro instruction $MI_j$. For example, $DT_n$ comprises $DT_m$, $DT_{m+1}$, and $DT_{m+2}$ and $MI_n$ consists of $I_m$, $I_{m+1}$, and $I_{m+2}$. The object programs made by arranging the processes in accordance with the order of $DT_j$ and $MI_j$ are transferred to the host processor 2. A processing flow in this case is shown at 33. A pair of $DT_j$ and $MI_j$ is called a macro process j. In this embodiment, the steps m to m+8 of the source programs 35 are combined to three macro processes n to n+2. On the other hand, the object programs are made by extracting only the fundamental arithmetic operation instructing processes $I_m$ to $I_{m+3}$ and transferred to the sequence processor 3. A processing flow in this case is shown at 32. When the processes are executed by the hardware, a set of fundamental arithmetic operating instructions are executed by a command of the macro instruction $MI_j$ from the host processor 2. Namely, in the case of the embodiment, the processes $I_m$, $I_{m+1}$, and $I_{m+2}$ are executed in correspondence to the macro instruction $MI_n$; the processes $I_{m+3}$, $I_{m+4}$, and $I_{m+5}$ are executed in correspondence to $MI_{n+1}$; and the processes $I_{m+6}$, $I_{m+7}$, and $I_{m+8}$ are executed in correspondence to $MI_{n+2}$. For the data transfer processes, $DT_n$ is first executed and $MI_n$ is then indicated to the sequence processor 3 from the host processor 2, and while this process is being executed by the sequence processor 3, the next data transfer process $DT_{n+1}$ is executed. In a manner similar to the above, the process of $DT_{n+2}$ is performed in parallel with the process of $MI_{n+1}$ and the process of $DT_{n+3}$ is executed in parallel with the process of $MI_{n+2}$. For the process to return the data from the register file 22 to the main memory 6, the data which was processed by the two-preceding macro instruction, i.e., the data which was processed by $MI_n$ in the case of the process of $DT_{n+2}$ is transferred. Due to this, the data which has completely been processed can be returned to the main memory 6.

Fundamentally, the macro process j can be constituted in an arbitrary manner. In this compiler system, the macro instruction j is produced so as to almost equalize the executing time of the executing process of the macro instruction $MI_j$ which is executed by the sequence processor 3 and the executing time of the processes consisting of a combination of the indicating process of $MI_j$ by the host processor 2 and the data process $DT_{j+1}$. On the other hand, in the scalar arithmetic operating processes, so long as the foregoing conditions are satisfied, the scale of the macro processes is reduced as little as possible. Thus, the real-time processing performance can be improved.

A compiler system in the case of the vector arithmetic operating processes will now be described with reference to FIGS. 12 and 13.

Figure 12:
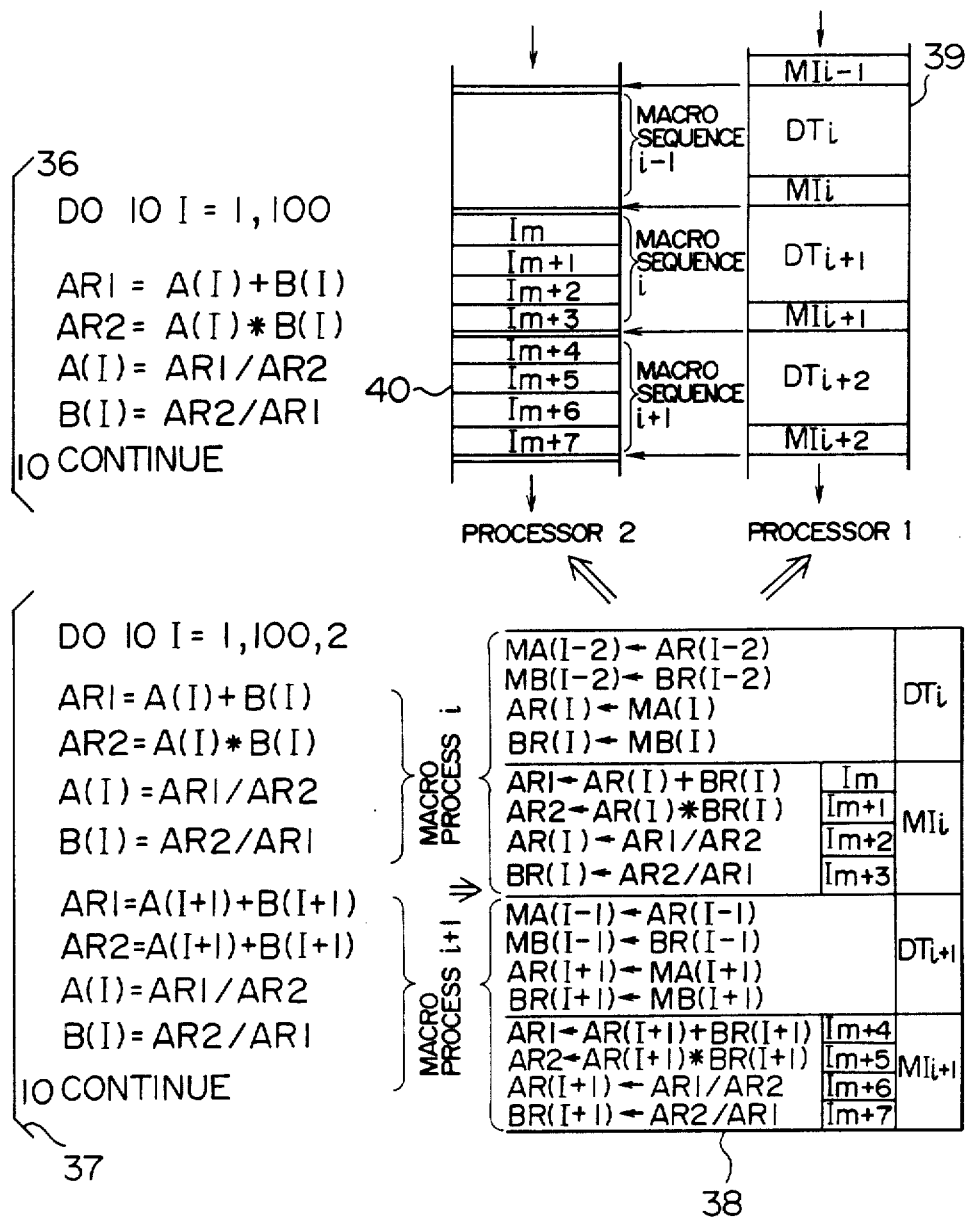
FIG. 12 is a first example diagram showing the development of vector processes and the distribution of object programs by a compiler system.

In FIG. 12, reference numeral 36 denotes an example of source programs for vector processes. A(I) and B(I) denote the Ith data of the vector data (array variables) in the main memory 6. In correspondence to them, vector data AR(I) and BR(I) are also set in the register file 22. The vector length in this embodiment is set to 100 (I changes from 1 to 100). For the arithmetic operations in the loop, first, the result of the addition of A(I) and B(I) is transferred to the $AR_1$. Subsequently, A(I) and B(I) are multiplied and the result is transferred to the $AR_2$. Next, the $AR_1$ is divided by the $AR_2$ and the result is returned to A(I). Finally, the $AR_2$ is divided by the $AR_1$ and the result is transferred to B(I). The foregoing processes are repeated by the DO loop hundred times from I=1 to I=100. In this compiler system, as a compiler system for vector processes in which an importance is paid to the real-time processes, the processes in the loop are first developed by two processes and the DO loop makes such an object program as to increase the value of I by, e.g., two at a time. When this object program is described by the equivalent source program, it will be as shown at 37. The former processes in the loop of the source programs 37 are set to a macro process i and the latter processes are set to a macro process i+1. The macro processes i and i+1 can be expressed by the operations of the actual machine language level as shown at 38. In the data transfer process $DT_i$, there are performed the processes to respectively transfer the resultant data AR(I−2) and BR(I−2) in the register file which were processed by the two-preceding macro instruction $I_{i-2}$ to the vector data MA(I−2) and MB(I−2) in the main memory 6 and the transfer processes to respectively transfer the vector data MA(I) and MB(I) in the main memory 6, which will be necessary in the processes by the macro instruction $MI_i$, to the corresponding vector data AR(I) and BR(I) in the register file 22. The macro instruction $MI_i$ simultaneously indicates the four fundamental arithmetic operating processes ($I_m$, $I_{m+1}$, $I_{m+2}$, $I_{m+3}$) corresponding to i=1 in the loop in the embodiment of FIG. 10. The same shall also apply to $DT_{i+1}$ and $MI_{i+1}$ and these processes are described in detail in the operations 38. Next, in a manner similar to the case of the scalar processes shown in FIG. 10, the compiler system produces and transfers object programs 39 on the basis of the arithmetic operation processing sequence in accordance with the order of the data transfer process $DT_i$ to the host processor 2 and the macro instruction $MI_i$ to the macro instruction sequence processor 3 and, thereafter, subsequently, in accordance with the order of $DT_{i+1}$ and $MI_{i+1}$. Object programs 40 consisting of only the execution instructing processes $I_k$ of the instructions to the arithmetic operation processing unit 1 are produced and transferred to the sequence processor 3 on the basis of the arithmetic operation processing sequence by the method whereby the macro sequence i consisting of the instructions $I_m$, $I_{m+1}$, $I_{m+2}$, and $I_{m+3}$ as the fundamental arithmetic operating instructions is combined as the macro instruction executing process corresponding to the macro instruction $MI_i$, the macro sequence i+1 consisting of the fundamental arithmetic operating instructions $I_{m+4}$, $I_{m+5}$, $I_{m+6}$, and $I_{m+7}$ is combined in correspondence to the macro instruction $MI_{i+1}$, and the like. Similarly to the case of the scalar arithmetic operating processes, the data transfer process $DT_i$ and the indicating process of the macro instruction $MI_i$ by the host processor 2, the execution indicating process (macro sequence i−1) of the macro instruction $MI_{i-1}$ by the macro instruction sequence processor 3, and the arithmetic operation executing processes by the arithmetic operation instruction executing unit 18 which are realized by the execution indicating processes are executed in parallel. The execution in the hardware is as mentioned before. In this embodiment, two loops are developed. However, when an amount of arithmetic operations in the loop is large, the loops are not developed but it is sufficient to merely divide the processes in one loop into several areas and to define the macro processes in a manner similar to the case of the scalar processes.

In the vector arithmetic operating processes according to this system, the arithmetic operation processing unit in the loop is defined as one macro instructing process and the data transfer processes with the main memory 6 are also finely performed on an arithmetic operation processing unit basis in the loop. Thus, this system is suitable for the vector arithmetic operating processes which requires the real-time processes. On the other hand, in this system, since the processes in the loop are fundamentally executed like scalar processes, no problem occurs even if there are complicated relations among the stages of the vector processes and among the vector parameters.

An explanation will now be made with reference to FIG. 13 with respect to a method of compiling the vector arithmetic operating processes in the system in which vector data are combined every relatively long vector length and transferred by the transfer instruction of the host processor 2, thereby raising the average processing speed for such an application that a high real-time processing performance is not required.

The vector arithmetic operating processes which are executed are the same as those in the case of FIG. 12. The compiler system first develops the processes in a loop 44 into small loops consisting of two groups of arithmetic operations each having a predetermined vector length (in this embodiment, the vector length is set to 10). The former half group is set to the macro process i and the latter half group is set to the macro process i+1. In these two macro processes, different vector data areas in the register file are used in order to avoid the contradiction in the data transfer (namely, the data which is being processed is broken, the unprocessed data is input, or the like). In this embodiment, AR(I) and BR(I) are provided and CR(I) and DR(I) are provided. The small loops are further divided into loops 45, 47, 48, and 50 in the data transfer processing portions and loops 46 and 49 in the arithmetic operation processing portions. The loops for the data transfer processes are also separated to the loops 45 and 48 for the transfer processes to the register file 22 in the arithmetic operation processing unit 1 from the main memory 6 and the loops 47 and 50 for the transfer processes from the register file 22 to the main memory 6. Reference numeral 42 denotes equivalent source programs which are obtained by developing and separating vector processes 36. After that, the respective loops are regarded as a group of macro arithmetic operations and a group of transfer processes and converted into the machine languages. Reference numeral 53 denotes operations and processing sequence which are obtained by developing and separating the processes in the loop 44 and by converting into the machine languages. The data transfer process $DT_i$ comprises: the transfer process of the resultant data processed by the two-proceding macro instruction $MI_{i-2}$ from the register file 22 to the main memory 6; and the transfer process of the data, which will be necessary in the macro instruction $MI_i$, from the main memory 6 to the register file 22. $MI_i$ denotes a macro instruction to indicate a group of the substantial arithmetic operating processes in the macro process i. Then, the object programs are distributed to each processor in substantially the same manner as the vector processes in FIG. 12 mentioned above. The processes which are executed in parallel are also substantially similar to those in the cases of the vector processes in FIG. 12 and scalar processes in FIG. 10.

The vector length constituting the small loops in a loop 34 according to this system can be varied in accordance with the application. When the fundamental loop length is very long, the length of small loop of the internal processes can be also set to a large value. In general, as the length of the small loop in long, there are advantages such that the transfer processes can be continuously performed and the number of processes to indicate macro instructions can be reduced. Thus, the overheads on the side of the host processor 2 can be reduced and the fundamental arithmetic operation indicating processes on the side of the macro instruction sequence processor 3 can be more continuously executed, so that the processing speed can be further improved. In the case where the processes on the side of the sequence processor 3 fundamentally become a bottleneck, by setting the length of the small loop to a small value just before the timing when the side of the host processor 2 becomes a processing bottleneck, the real-time processing capability is improved and this method is more effective. The compiler system trades off these elements and determines the small loop length so as to obtain the optimum state as a whole. In the vector processes in this system, the processes in each stage of the vector arithmetic operations need to be relatively independent. Therefore, if the vector parameters have the complicated relation (for instance, $A(I) = A(I-10)*B(I)$) among the stages of the other vector arithmetic operations, a further special device is needed to couple the macro processes. The same shall also apply to the vector arithmetic operations in a general super computer. However, no problem occurs even if the complicated relation exists among the parameters in the macro processes.

As explained above, it is possible to provide an arithmetic operation processing apparatus having a compiler system in which in the random arithmetic operating (scalar processes) processes or vector arithmetic operating processes, even if there is the complicated relation among the parameters or among the stages of the vector processes, the object programs can be distributed to two processors such that the data transfer processes and arithmetic operation executing processes with the memory system can be executed in parallel. Therefore, the parallel processing capability of the hardware can be effectively used and the arithmetic operation processing speed can be further raised.

I claim:

1. An arithmetic operation processing apparatus of a parallel processing type, comprising:
    a first processor having means for outputting a series of macro instruction sequences which are each obtained by dividing a whole executing sequence composed of multiple instructions to specify respective arithmetic operating processes;
    a second processor connected to receive said series of macro instruction sequences from said first processor and including means for storing said multiple instructions of said whole executing sequence, and means coupled to said storing means for outputting instructions relevant to an arithmetic operating process of a macro instruction sequence in response to the receipt of each macro instruction;
    an arithmetic operating unit for executing an arithmetic operation on data in accordance with an instruction received from said second processor; and
    data transfer means for transferring necessary operand data and result data relevant to said arithmetic operations between said first processor and said arithmetic operating unit.

2. An arithmetic operation processing apparatus of a parallel processing type, comprising:
    a first processor having means for outputting a series of macro instruction sequences which are each obtained by dividing a whole executing sequence composed of multiple instructions to specify respective arithmetic operating processes;
    a second processor connected to receive said series of macro instruction sequences from said first processor and including means for storing said multiple instructions of said executing sequence, means coupled to said storing means for outputting instructions relevant to an arithmetic operating process of a macro instruction sequence in response to the receipt of each macro instruction;
    an arithmetic operating unit for executing an arithmetic operation on data in accordance with an instruction received from said second processor;
    said second processor including data transfer means for transferring necessary operand data and result data relevant to said arithmetic operations between said first processor and said arithmetic operating unit;
    wherein said first processor performs data transfer using said data transfer means with said arithmetic operating unit in parallel with the output of an instruction to the arithmetic operating unit from said second processor.

3. An apparatus according to claim 2, wherein said data transfer is performed between memory means connected to said first processor and a register file which is provided in said arithmetic operating unit.

4. An apparatus according to claim 3, wherein said first processor includes means for outputting an instruction for controlling said arithmetic operating unit to execute an arithmetic operation, and further including first switching means for receiving instructions from both of said second and first processors and for selectively supplying one of said instructions to the arithmetic operating unit.

5. An apparatus according to claim 4, wherein said second processor has a data input/output function, and further including second switching means for enabling a transfer of said data either between the first processor and the arithmetic operating unit or between the second processor and the arithmetic operating unit by selectively connecting one of said first and second processors to said arithmetic operating unit.

6. An apparatus according to claim 2, wherein said second processor has a data input/output function, and further including second switching means for enabling a transfer of said data either between the first processor and the arithmetic operating unit or between the second processor and the arithmetic operating unit by selectively connecting one of said first and second processors to said arithmetic operating unit.

7. An apparatus according to claim 6, wherein said data transfer between the second processor and the arithmetic operating unit is performed between a local memory provided in the second processor and a register file provided in the arithmetic operating unit.

8. An arithmetic operation processing apparatus of a parallel processing type, comprising:
    a first processor having means for outputting a series of macro instruction sequences which are each obtained by dividing a whole executing sequence composed of multiple instructions to specify respective arithmetic operating processes;
    a second processor connected to receive said series of macro instruction sequences from said first processor and including means for storing said multiple instructions of said whole executing sequence, and means coupled to said storing means for outputting instructions relevant to an arithmetic operating process of a macro instruction sequence in response to the receipt of each macro instruction;
    an arithmetic operating unit for executing an arithmetic operation on data in accordance with an instruction received from said second processor; and
    first switching means for receiving instructions from both of said second and first processors for selectively supplying one of said instructions to the arithmetic operating unit;

wherein said first and second processors have the same machine instruction set for controlling said arithmetic operating unit to execute arithmetic operations and are performed for said arithmetic operating unit in obedience to said machine instruction set.

9. An arithmetic operation processing apparatus of a parallel processing type, comprising:
a first processor having means for outputting a series of macro instruction sequences which are each obtained by dividing a whole executing sequence composed of multiple instructions to specify respective arithmetic operating processes;
a second processor connected to receive said series of macro instruction sequences from said first processor and including means for storing said multiple instructions of said whole executing sequence, and means coupled to said storing means for outputting instructions relevant to an arithmetic operating process of a macro instruction sequence in response to the receipt of each macro instruction;
an arithmetic operating unit for executing an arithmetic operation on data in accordance with an instruction received from said second processor;
wherein at least one macro instruction designates at least one instruction which is continuously executed.

10. An arithmetic operation processing apparatus of a parallel processing type, comprising:
a first processor having means for outputting a series of macro instruction sequences which are each obtained by dividing a whole executing sequence composed of multiple instructions to specify respective arithmetic operating processes;
a second processor connected to receive said series of macro instruction sequences from said first processor and including means for storing said multiple instructions of said whole executing sequence, and means coupled to said storing means for outputting instructions relevant to an arithmetic operating process of a macro instruction sequence in response to the receipt of each macro instruction;
an arithmetic operating unit for executing an arithmetic operation on data in accordance with an instruction received from said second processor;
wherein the instruction constituting a macro instruction and said macro instruction are stored as machine language into said first processor.

11. An arithmetic operation processing apparatus of a parallel processing type, comprising:
a first processor having means for outputting a series of macro instruction sequences which are each obtained by dividing a whole executing sequence composed of multiple instructions to specify respective arithmetic operating processes;
a second processor connected to receive said series of macro instruction sequences from said first processor and including means for storing said multiple instructions of said whole executing sequence, and means coupled to said storing means for outputting instructions relevant to an arithmetic operating process of a macro instruction sequence in response to the receipt of each macro instruction;
an arithmetic operating unit for executing an arithmetic operation on data in accordance with an instruction received from said second processor;
wherein said first processor has means for indicating a macro instruction sequence representative of a number of instructions to be executed by the arithmetic operating unit,
and said second processor has means for latching a number of instructions indicated by said second processor and counting a number of arithmetic operating instructions for making the second processor operative each time an instruction is executed by the arithmetic operating unit until the macro instruction coincides with the number of instructions indicated and means for stopping the operation of the first processor when the execution of the macro instruction sequence which is being executed is finished if a next macro instruction is indicated from the first processor while the second processor is operating.

12. A parallel arithmetic operating type system for use as an arithmetic operation processing apparatus of a parallel processing type, comprising:
an arithmetic operation processing unit to perform arithmetic operating processes on the basis of instructions;
a first processor having means which divides a whole arithmetic operation processing sequence of instructions to be executed by said arithmetic operation processing unit into a macro sequences corresponding to macro instructions received from outside of said first processor and sets these macro sequences as macro instruction steps, and which indicates the instructions forming each macro instruction step one by one along a macro instruction sequence basis to the arithmetic operation processing unit in response to a macro instruction, and which is returned to a waiting mode of a next macro instruction after completion of the indication of the instructions included in a relevant macro instruction steps if there is no macro instruction from the outside;
a second processor having means for controlling the whole arithmetic operating sequence replaced to a plurality of macro instruction steps and for generating macro instructions to said first processor, said second processor including means for performing a transfer process of data with said arithmetic operation processing unit in parallel with the operations of at least the arithmetic operation processing unit and the first processor;
data transfer means for transferring necessary operand data and result data relevant to said arithmetic operations between said second processor and said arithmetic operation processing unit; and
a compiler having object program generating means for combining the arithmetic operation processing sequence described as compiling means of a compiler system to describe the arithmetic operation processing sequence of the arithmetic operation processing unit to a plurality of macro sequences consisting of one or more instructions upon compiling along said processing sequence, for defining each of said plurality of macro sequences as a macro instruction step, for assigning said macro instruction steps to the first processor, for assigning the data transfer processing and the generating operation of each macro instruction output for the first processor to the second processor, during the execution of the nth macro instruction step by the first processor, for enabling said second processor to transfer of said data, which will be necessary by the second processor in a subsequent macro instruction step, or resultant data processed in a preceding macro instruction step, in parallel between a memory system provided for the second processor and the arithmetic operation processing unit.

13. A system according to claim 12, further including means for compiling loop arithmetic operations, comprising a compiling system which develops loop processes to object programs in a manner such that the series of arithmetic operating processes in a loop are regarded as the macro sequences and defined to the macro instruction steps and assigned to the first processor, the data transfer processing and the generating operation of the macro instruction to the first processor are assigned to the second processor, and during the execution of the macro instruction step of the nth loop by the second processor, there is executed in parallel therewith the process to transfer data, which will be necessary by the second processor in the macro instruction steps of the (n+1)th and subsequent loops, or the resultant data processed by the (n−1)th and preceding macro instruction steps between the memory system provided for the second processor and the arithmetic operation processing unit.

* * * * *